Dec. 14, 1937.    W. H. CHURCHILL    2,102,554
THREADED NUT DEVICE
Filed Oct. 24, 1936

Inventor:
Wilmer H. Churchill,
by Walter S. Jones
Atty.

Patented Dec. 14, 1937

2,102,554

UNITED STATES PATENT OFFICE 2,102,554

THREADED NUT DEVICE

Wilmer H. Churchill, Saugus, Mass., assignor to United-Carr Fastener Corporation, Cambridge, Mass., a corporation of Massachusetts Application October 24, 1936, Serial No. 107,414

2 Claims. (Cl. 85—32)

My invention aims to provide improvements in threaded nut devices.

In the drawing which illustrates a preferred embodiment of my invention:

My invention relates to a nut similar to that shown and described in United States Letters Patent No. 1,873,895 to Arthur W. Kimbell, issued August 23, 1932, and more particularly to an improved means for attachment of such a nut to a support. Heretofore nuts of the type shown in the patent referred to above have been attached by welding, nailing and even by screws. These methods are rather expensive and therefore I have provided integral attaching means which simplify attachment.

Figure 1:
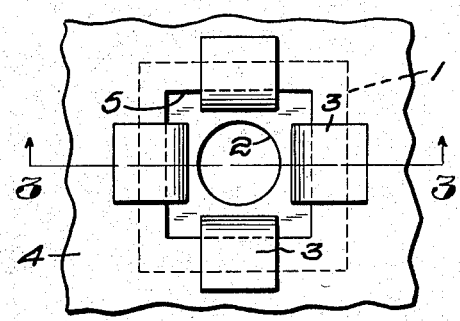
Figure 1 is a plan view of my improved nut secured to a sheet metal part.
Figure 2:
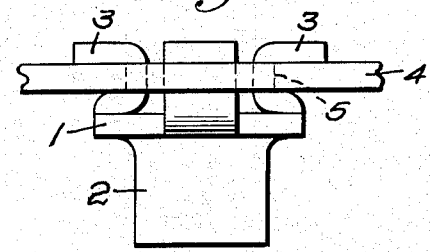
Fig. 2 is a side elevation of the structure shown in Figure 1.
Figure 5:
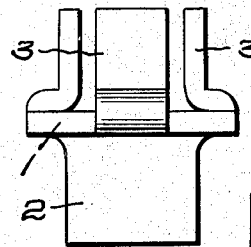
Fig. 5 is a side elevation of my improved nut before attachment.
Figure 7:
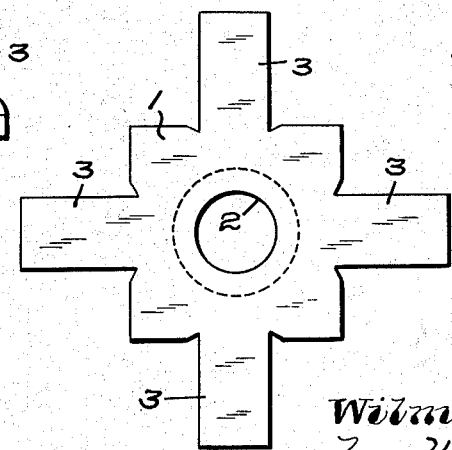
Fig. 7 is a plan view of the blank from which the nut is formed after the shank has been drawn.
Figure 6:
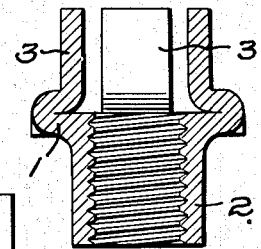
Fig. 6 is a section taken on the line 6—6 of Fig. 5.

My improved nut is formed from sheet metal and has a base 1 from which is drawn a tubular shank 2 preferably internally threaded as shown in Figs. 2 and 6. At the edges of the base are integral flat fingers 3. The base is preferably rectangular in outline to provide a flange and the fingers extend inwardly from each side toward the center of the nut preferably on that side of the base flange 1 opposite the side from which extends the shank 2. The fingers then extend outwardly from the base flange in spaced parallel relation and form a rectangular extension, as shown in Figs. 1 and 5.

Figure 3:
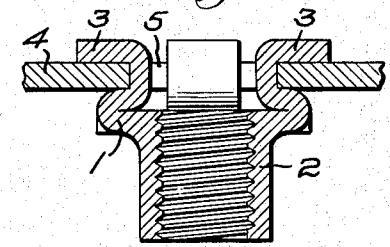
Fig. 3 is a section taken on the line 3—3 of Figure 1.
Figure 4:
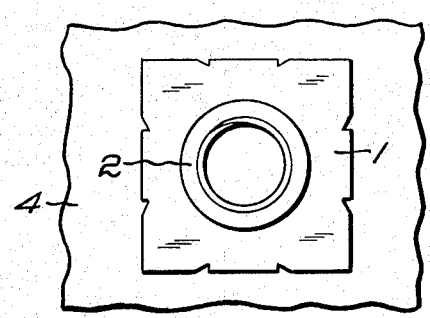
Fig. 4 is a bottom plan view of the structure shown in Figs. 1 and 2.

When attaching my improved nut to a support such as the thin sheet metal part 4 shown in Figs. 1, 2 and 3, it is advisable to provide a rectangular aperture 5 about the size and shape of the cross-sectional area of the extension provided by the fingers 3. The fingers 3 are entered through the aperture 5 and the free ends are bent outwardly and downwardly against one face of the support 4 as illustrated. Thus, the support 4 is clamped tightly between the inwardly bent portions of the fingers and the outwardly bent portions as shown. The nut is therefore held securely in place against displacement by rotation or accidental axial movement so that a suitable screw may be threaded into the shank 2 to secure another part (not shown) in position.

My device is simple, inexpensive, and efficient. It is formed entirely from a single piece of sheet metal and can be made quite easily and in relatively fast production.

While I have illustrated and described a preferred embodiment of my invention, I do not wish to be limited thereby, because the scope of my invention is best defined by the following claims.

I claim:

1. A sheet metal nut formed from a single piece of metal and having a flange portion, a hollow threaded shank extending from said flange and a plurality of bendable fingers extending from the periphery of said flange inwardly parallel to the plane of said flange and then outwardly at right angles thereto for the purpose described.

2. A sheet metal nut formed from a single piece of metal and having a flange portion, a hollow threaded shank extending from said flange and a plurality of flat bendable fingers extending from the periphery of said flange inwardly parallel to the plane of said flange and then outwardly at right angles thereto for the purpose described, said extended portions of said fingers being arranged in the form of a rectangle to fit a rectangular hole in a nut support.

WILMER H. CHURCHILL.